No. 714,572. Patented Nov. 25, 1902.
E. T. FREEMAN.
MACHINE FOR INSERTING FASTENINGS.
(Application filed Jan. 2, 1902.)
(No Model.) 3 Sheets—Sheet 2.
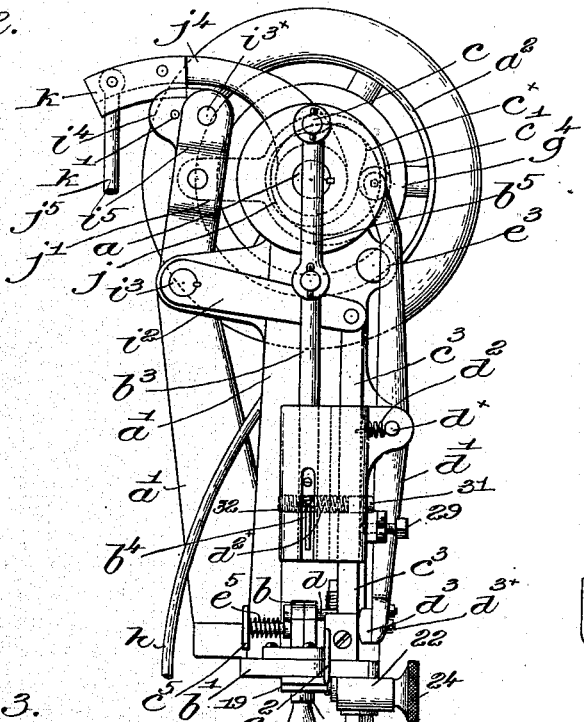
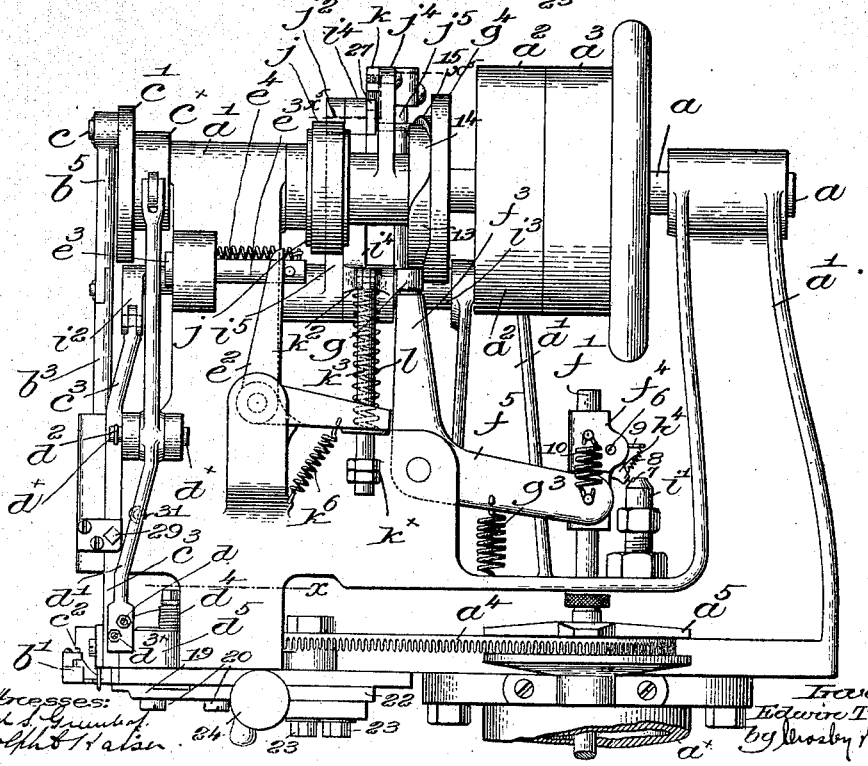

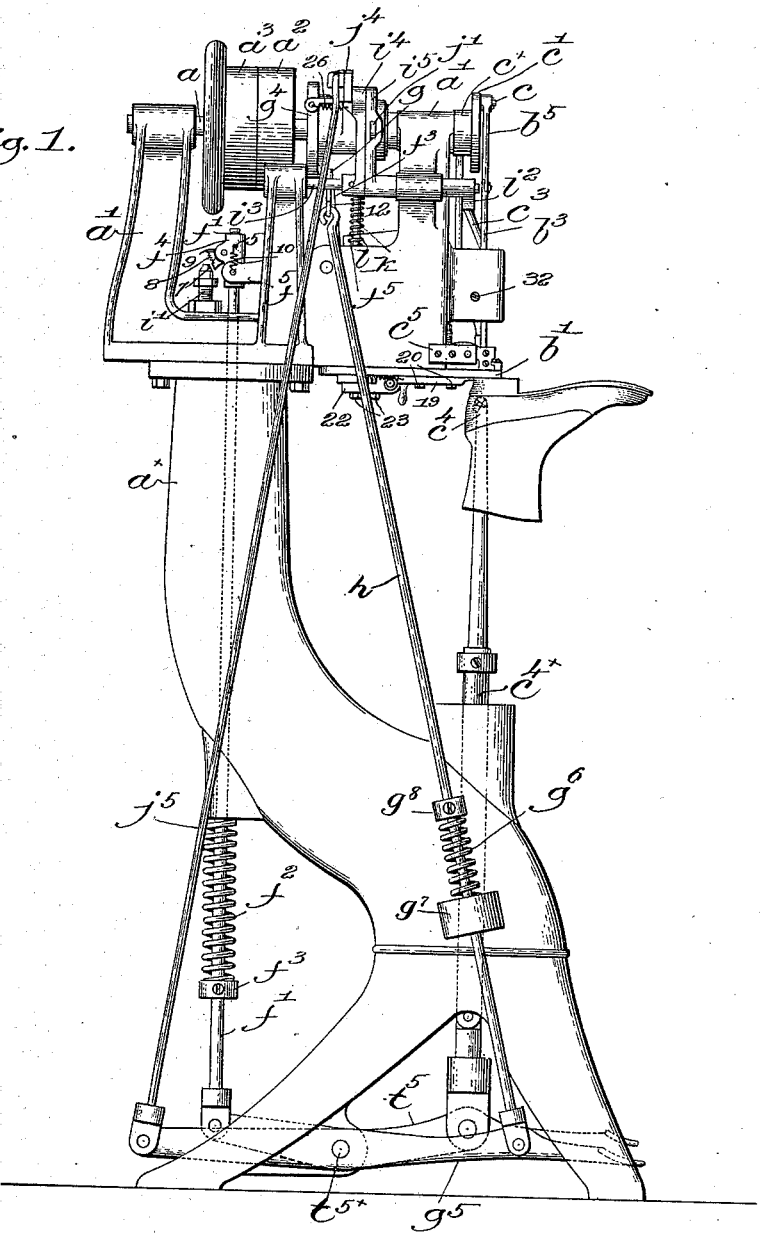

No. 714,572. Patented Nov. 25, 1902.
E. T. FREEMAN.
MACHINE FOR INSERTING FASTENINGS.
(Application filed Jan. 2, 1902.)
(No Model.) 3 Sheets—Sheet 3.
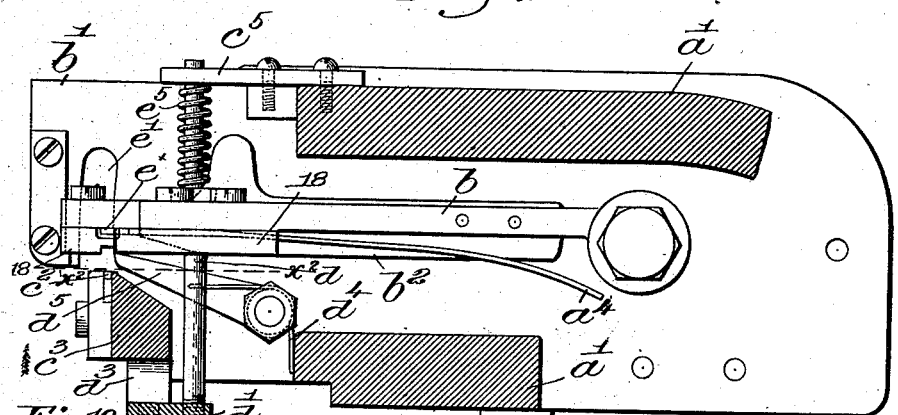
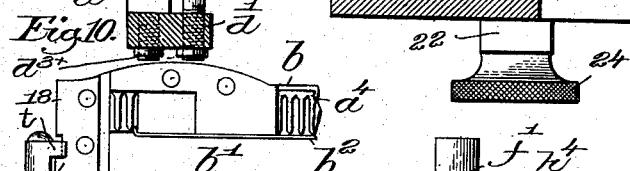
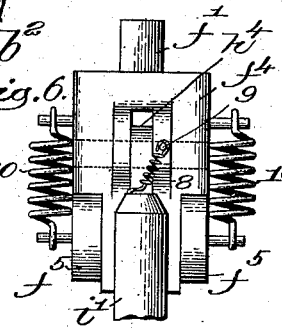
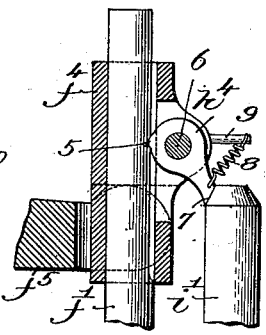
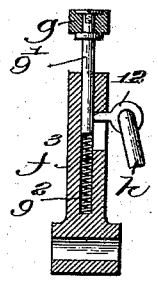
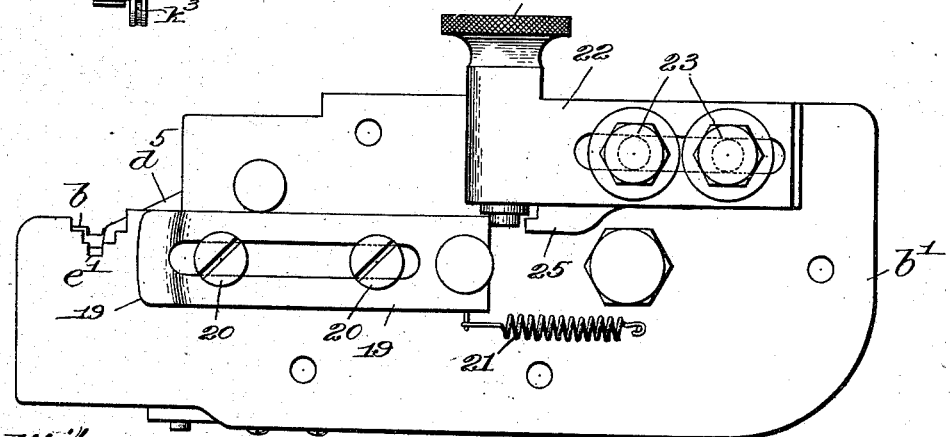
Witnesses:
Fred S. Greenleaf.
Adolph B. Walser.
Inventor,
Edwin T. Freeman,
By Crosby Gregory,
Attys.
THE NORRIS PETERS CO., PHOTO-LITHO., WASHINGTON, D. C.

UNITED STATES PATENT OFFICE.

EDWIN T. FREEMAN, OF BOSTON, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

MACHINE FOR INSERTING FASTENINGS.

SPECIFICATION forming part of Letters Patent No. 714,572, dated November 25, 1902.

Application filed January 2, 1902. Serial No. 88,075. (No model.)

*To all whom it may concern:*

Be it known that I, EDWIN T. FREEMAN, a subject of the King of Great Britain, and a resident of Boston, in the county of Suffolk and State of Massachusetts, have invented an Improvement in Machines for Inserting Metallic Fastenings, of which the following description, in connection with the accompanying drawings, is a specification, like characters on the drawings representing like parts.

This invention, relating to machines for inserting fastenings, is represented as an improvement on the machine described in reissued United States Letters Patent No. 11,962, dated January 21, 1902.

Among the important features of my invention are improvements in the mechanism connecting the operative parts of the machine with the driving-shaft, in the means for disconnecting said operative parts from the driving-shaft and suspending the insertion of fastenings while the driving-shaft continues in operation, and in the means for restoring said operative parts to the control of the driving-shaft when fastenings are again to be inserted.

In the accompanying drawings, Figure 1 is a left-hand side view of a machine embodying my invention in one of the best forms now known to me. Fig. 2 is a front view of the head portion of the machine. Fig. 3 is a right-hand side view of the head portion of the machine. Fig. 4 is a section below the line $x$, Fig. 3, showing the awl-bar, the raceway, and mechanism for feeding fastening material. Fig. 5 is a top view, partly in section, on line $x^5 x^5$, Fig. 3, of parts of the clutch or connecting and disconnecting mechanism. Figs. 6, 7, and 8 are views of parts of the mechanism to lower the stock-support. Fig. 9 is an underside view of the parts shown in Fig. 4; and Fig. 10 is a detail looking in the direction of the arrow, Fig. 4, from the position of dotted lines $x^2 x^2$, Fig. 4, with the lever $d^5$ and the rod $d'$ omitted for clearness. Fig. 11 is a top view of the cutter, showing the front end of the raceway in section.

As I have herein chosen to illustrate my invention the fastenings to be driven are represented as cut one at a time from a nail-strip $a^4$; but my improvements may be used to advantage in machines employing other kinds of fastening material. The driving-shaft $a$, supported in bearings erected on the head $a'$, sustained on a column $a^\times$, carries a loose pulley $a^2$ and a fast pulley $a^3$, to which power can be transmitted in any well-known manner. The driver-bar $b^3$ carries at its lower end a driver $b^4$, and said bar is connected at its upper end by a link $b^5$ to a crank-pin $c$, that extends from the front side of a cam $c'$, mounted on the driving-shaft $a$, whereby the driver-bar is reciprocated in its bearing in the frame or head $a'$. The awl $c^2$ is connected to an awl-bar $c^3$, operated as will be described. A spring $d^2$, connected at one end with the awl-bar and secured at its other end to a pivot-pin $d^\times$, acts normally to move the awl backwardly over the stock after the stock has been fed. The nail-strip $a^4$, supplied from reel $a^5$, is led through a longitudinal groove in a raceway $b$, pivotally attached at its rear end to the work-plate $b'$. Spring $b^2$, connected to the raceway, sustains the lower edge of the nail-strip and keeps its upper edge against the upper side of the groove in the raceway, the end of said spring $b^2$ being shaped to act as a retaining-pawl to prevent backward movement of the strip $a^4$. A spiral spring $e^5$ takes bearing at one end on plate $c^5$ and at its other end engages the raceway, as shown in Figs. 2 and 4. The raceway is held by this spring $e^5$ against an adjustable finger or projection $d$ on the lower end of a lever $d'$, having its fulcrum at $d^\times$ on the head $a'$. The upper end of said lever carries a cam-roll, which when the machine is running is acted upon by the edge $c^\times$ of the cam $c'$. When the awl is in the stock, a projection $d^3$, secured by screw $d^{3\times}$ to the lower end of the lever $d'$, acts against and moves the awl-bar toward the driver to feed the stock, and at the same time the adjustable finger $d$ (see Fig. 4) moves the raceway in opposition to the spring $e^5$. During such movement of the lever $d'$ and the raceway a spring $d^4$ causes the end of pawl $d^5$ to enter a cross-notch of the raceway and pass into the space between the two endmost nails of the nail-strip.

After the awl has fed the stock it is raised, and immediately thereafter the lower end of the lever $d'$ is moved outwardly, or to the right, viewing Fig. 2, by the spring $d^{2\times}$, and at the same time the awl-bar $c^3$ is moved to the right by spring $d^2$, and spring $e^5$ moves the front end of the raceway to the right. Spring $d^{2\times}$, which holds the upper end of lever $d'$ in contact with its cam and which moves the lower end of the lever to the right when permitted by the cam, is contained in a drilled hole in the head and acts on lever $d'$ through plunger 31. The tension of the spring may be adjusted by screw 32. As the raceway is moved toward the driver, now in its elevated position, the end of the pawl $d^5$ is moved with the raceway, and owing to the difference in position of the centers of oscillation of the raceway and pawl the latter acts against the inner side of the endmost fastening of the strip and moves the strip longitudinally in the raceway to place the endmost nail in line with the hole $e^\times$ of the raceway. The driver then descends, enters the hole $e^\times$, meets the nail-strip supported by the pawl, and cuts off the nail against a cutting edge on the pawl, thus leaving a fastening, which is driven through the throat $e'$ in the work-plate as the driver completes its descent. The extent of the stock-feeding movement of the awl may be adjusted by screw 29.

When it is desired to suspend the insertion of fastenings, the work-support $c^4$ is depressed into its lowest position, as will be described, to permit the stock to be removed therefrom or new stock to be applied thereto, or to enable the operator to move the stock about on the work-support, and at the same time the vertical movement of the awl-bar will be suspended, as will be described, and a spring $e^4$ will be permitted to move a stud $e^3$ into a position to arrest the upper end of the lever $d'$ in its outward position where left by the periphery $c^\times$ of the cam $c'$, the lever then holding the raceway away from the driver in position to compress the spring $e^5$, and consequently the fastening material will neither be fed nor cut. When the stud $e^3$ is actuated by the spring $e^4$ to lock the lever $d'$, said lever is also prevented from moving the awl to feed the stock.

The parts so far referred to are and may be substantially as represented in said patent and need not, therefore, be herein further described.

The awl-bar $c^3$ is jointed at its upper end to a lever $i^2$, fixed to a shaft $i^3$, having its bearings in the head or frame $a'$. The shaft $i^3$ has also fixed to it a lever $i^4$, and close to it a lever $i^5$ is mounted loosely on said shaft. The loose lever $i^5$ is moved constantly while the driving-shaft is in operation by an eccentric-strap $j'$, connected with the lever and actuated by a cam or eccentric $j$ on the shaft $a$. The continuously-operated lever $i^5$ constitutes an actuator for the awl-bar. The lever $i^4$, which is fixed, as stated, to the shaft $i^3$, carries a clutch-pin $j^2$. The constantly-operated lever $i^5$ has a clutch-hole $i^{3\times}$, and the spring 26 operates to force the clutch-pin $j^2$ toward the lever $i^5$ and, when permitted, into the clutch-hole $i^{3\times}$. When the clutch-pin $j^2$ is in engagement with the lever $i^5$, a positive connection is established between the driving-shaft and the awl, whereby the awl is given a positive movement in both directions, and the awl is thus operated by the driving-shaft so long as the clutch-pin continues in engagement with lever $i^5$. A lever $j^4$, having a wedge-shaped cam $k$ and mounted loosely on the shaft $a$, is connected by a rod $j^5$ with the starting-treadle $g^5$, pivoted at $t^{5\times}$. When the treadle $g^5$ is released by the operator, the outer end of the lever $j^4$ is immediately lowered through the action of the spring $g^6$, one end of which bears on lug $g^7$, extending from the machine-frame, while its other end acts against the collar $g^8$, secured to rod $h$, pivoted at its lower end to the front end of treadle $g^5$. In this movement of lever $j^4$ the cam $k$ is lowered until it meets a stud $k'$ and is stopped by it in such position that as the upper end of the lever $i^5$ is moved outwardly the head 27 of the clutch-pin $j^2$ is made to engage the wedge-shaped end of the cam and the clutch-pin is moved against the tension of the spring 26, withdrawing it from the loose lever $i^5$ and stopping the lever $i^4$ and shaft $i^3$ and leaving the awl-bar and awl in elevated position. Spring $l$ (shown in Figs. 1 and 3) bears at its lower end against the frame of the machine and at its upper end against the arm $k^2$ of lever $i^4$. The function of this spring $l$ is to hold the awl-bar and awl in elevated position when fastenings are not being inserted. The pin $j^2$ constitutes a clutch to couple the constantly-moving loose lever $i^5$ with the lever $i^4$ to move the shaft $i^3$ and operate the awl or to uncouple said levers to leave the awl-bar and awl at rest in inoperative position.

The inwardly-extended arm $k^2$ of the lever $i^4$, fixed to the shaft $i^3$, is provided with a rod $k^3$, having an adjustable nut $k^\times$, which when said rod is lifted by turning the lever $i^4$ meets and turns the lever $e^2$ into position to permit the spring $e^4$ to move the stud $e^3$ against the back side of lever $d'$. In the normal operation of the machine when fastenings are being inserted the stud $e^3$ does not get between lever $d'$ and its cam $c^\times$, for before the upper end of lever $d'$ is moved outwardly sufficiently to allow stud $e^3$ to move between it and its cam the stud is withdrawn by means of spring $k^6$, which, being stronger than spring $e^4$, turns lever $e^2$ to move stud $e^3$ to the right, viewing Fig. 3, and out of contact with lever $d'$. This movement of lever $e^2$ is permitted by downward movement of the arm $k^2$ of lever $i^4$, which moves the nut $k^\times$ out of engagement with the lever $e^2$. When, however, the insertion of fastenings is to be suspended, the lever $i^4$ is stopped in position to leave the arm $k^2$ elevated, so that stud $e^3$ is allowed to remain in its forward position, and when in the rotation of cam $c^×$ the upper end of lever $d'$ is moved to its extreme outward position the stud $e^3$ is forced by spring $e^4$ past the edge of lever $d'$ and holds that lever in its extreme outward position until the insertion of fastenings is to be resumed. When fastenings are again to be inserted and the lever $i^4$ and its arm $k^2$ are again moved, the stud $e^3$ will be withdrawn by spring $k^6$ to permit the engagement of the lever $d'$ with its cam. The work-support $c^4$, having its shank $c^{4×}$ guided in the column $a^×$, is jointed at its lower end to a treadle $t^5$, mounted on a fulcrum $t^{5×}$. This treadle has secured to its opposite end a rod $f'$, surrounded by a spring $f^2$, that acts at one end against a suitable bearing on the column and at its other end against a collar $f^3$ on said rod, said spring acting normally to move the rod downwardly and force the work-support upwardly toward the work-plate $b'$ to clamp the stock.

The upper end of the rod $f'$ has coacting with it a clutch, one part of which, as shown, consists of a block $f^4$, that engages loosely the upper end of said rod. The other member of said clutch is herein represented as a lever $h^4$, having a projection 5 and pivoted on said block at 6, the outer end of said lever being shown as having a bevel-face 7 and as acted upon by a spring 8, connected at one end to a stud 9, the spring acting normally to keep the projection 5 against said rod. The block $f^4$ is seated by suitable springs 10 on the forked end of a lever or device $f^5$, shown as pivoted on the frame $a'$, said lever forming the initial member of the work-support-actuating means. The end $f^3$ of the lever $f^5$ is provided with a perforation which receives loosely a manually-controlled device, shown as a stud $g'$, provided with a cam-roll $g$, a spring $g^2$ acting normally to force the stud outwardly from said arm. A spring $g^3$, secured to the lever $f^5$ and to the frame, acts normally to hold the cam-roll $g$ in contact with the cam-shaped side (see Fig. 3) of the cam $g^4$, mounted on the driving-shaft $a$. The cam has a peripheral projection 13 at its front side, in which is a slight depression 14, the side wall 15 of which is made as a cam. The stud $g'$ has a projection 12, with which is connected a rod $h$, attached to the starting-treadle $g^5$.

When the operator desires to stop the insertion of fastenings and leave the work-support down while the shaft $a$ continues in motion, he will remove his foot from the treadle and let the spring $g^6$, surrounding the rod $h$, act to move said rod and cause the end of the roll $g$ to contact with the periphery of the shoulder 13 of the cam $g^4$, and as soon as the depression 14 (see Fig. 3) in said projection arrives above said roll the latter is moved outwardly by the spring $g^2$ to enter said depression. The entrance of the roll into the depression 14 lets the clutch $f^4 h^4$ descend to engage the rod $f'$ at one or another point thereof, according to the thickness of the stock, and immediately thereafter the cam edge 15 of the depression 14 in the cam $g^4$ in its further rotation acts upon the side of the roll $g$, moves the upper end of the lever $f^5$ outwardly, causing the clutch to draw up the rod $f'$ and impart to the horn its extra depression, and thereafter during the continued rotation of the shaft $a$ and its cam $g^4$ the roll pressed outwardly by the spring $g^2$ engages the flat front or left-hand (viewing Fig. 3) side of the projection 13 of the cam $g^4$, said roller contacting with a portion of the cam between the bottom of the depression 14 and the shaft $a$, and so long as the roller remains in that position the horn occupies its position of extra depression and remains at rest that the stock may be applied to or removed from the horn.

When the insertion of fastenings is to be again started, the operator will put his foot upon the treadle and through the rod $h$ will draw the stud $g'$ into the lever $f^5$ and place the roll $g$ in position for its periphery to contact with the cam-face on the front or left-hand side (viewing Fig. 3) of the outer rim of cam $g^4$ or that portion of the cam which extends beyond the periphery of the projection 13 of said cam, and so long as the operator retains his foot on the treadle $g^5$ fastenings will be formed and driven and the horn will be depressed intermittingly by cam $g^4$ to release the stock in order that the awl or other stock-feeding means may feed the stock over the work-support, the depression of the horn during the insertion of fastenings being to a less extent than the final extra depression thereof when the stock is to be removed from the work-support preparatory to the application of new stock to the work-support.

It will be seen that the roll $g$ is manually controlled through the starting-treadle $g^5$ and the intermediate connections and that its position with relation to the lever $f^5$ determines whether the work-support shall be actuated or be held at rest in its position of extra depression, said roll when in contact with the cam-face of the outer rim of the cam $g^4$ occupying its operative position and when in contact with the side of the projecting portion 13 of said cam occupying its inoperative position.

The depression 14 in cam $g^4$ determines the exact time in the cycle of operations of the machine when the work-support shall be lowered into its position of extra depression and left at rest.

It will be observed that the single treadle $g^5$, through the rods $j^5$ and $h$, controls the starting and stopping of the awl, the mechanism for feeding the fastening material, and the mechanism for feeding the stock, and also controls the mechanism for actuating the work-support, whereby the work-support is given an extra depression when the machine stops and is left in lowered position when fastenings are not being inserted and when fastenings are again to be inserted is raised to clamp the stock.

The head or frame has an adjustable stud $i'$, the upper end of which is represented as beveled, and whenever the lever $f^5$ under the action of the spring $g^3$ is turned far enough to place the end 7 of the lever $h^4$ in contact with said stud the lever is moved to cause the clutch to release the rod $f'$ and let the spring $f^2$ move the rod $f'$ and cause the work-support to rise until it clamps the stock firmly between its upper end and the work-plate $b'$. Preparatory to the feeding of the stock the lever $f^5$ is moved in opposition to the spring $g^3$ by the cam-face of the cam $g^4$, and the lever $h^4$ retires from the stud $i'$ and grasps and lifts the rod $f'$ to depress the work-support. The stud $i'$ may be adjusted to place it in its proper operative position.

The work-plate is provided at one side the slot $e'$ with a guide $t$, provided with a groove adapted to be entered by a projection 17 from a plate 18, attached to the raceway, said guide insuring the movement of the end of the raceway in a horizontal plane.

The under side of the work-plate is provided with an edge-gage 19, shown as slotted to slide on stud-screws 20, a spring 21 acting normally to retract said edge-gage. A block 22, adjustably attached to the under side of the work-plate by screws 23, has a spring-controlled releasing device 24, shown as a headed pin, and near and behind said pin when in its position to maintain the edge-gage in its forward position there is a back-stop 25, against which the rear end of the edge-gage abuts when in position to guide the shoe for the insertion of a second row of fastenings. After the insertion of the outer row of fastenings the device 24 may be withdrawn, allowing spring 21 to pull the edge-gage back against the stop 25.

The mechanism herein described for lowering the horn is not claimed specifically in this application; but the right is reserved to make this mechanism the subject-matter of a separate application.

Having fully described my invention, what I claim as new, and desire to secure by Letters Patent, is—

1. In a machine for inserting fastenings, a driving-shaft, a driver, an awl, mechanism intermediate the driving-shaft and the awl for operating the awl, said mechanism including a clutch, and means for operating the clutch to disconnect the awl from the driving-shaft and render the awl inoperative during repeated operations of the driving-shaft and driver.

2. In a machine for inserting fastenings, a driving-shaft, a driver, mechanism for actuating the driver to insert fastenings, an awl, mechanism intermediate the driving-shaft and the awl for operating the awl, said mechanism including a clutch, and means arranged to be operated independently of the regular operations of the machine while the driving-shaft is in operation for actuating the clutch to connect the awl with the driving-shaft and render the awl operative.

3. In a machine for inserting fastenings, a driving-shaft, a driver, an awl operated independently of the driver and arranged to be connected with the driving-shaft when fastenings are to be inserted and arranged to be disconnected from the driving-shaft when the insertion of fastenings is to be suspended, both the connection and disconnection being effected at the will of the operator, and means arranged to be operated while the driving-shaft is in operation for effecting a positive connection between the driving-shaft and the awl, whereby the awl is positively actuated in both directions.

4. In a machine for inserting fastenings, a driving-shaft, mechanism for feeding fastening material, an awl movable to enter and withdraw from the stock, means under the control of the operator for suspending the operations of the awl and the mechanism for feeding fastening material while the driving-shaft continues in operation, and mechanism under the control of the operator for establishing a positive connection between the awl and the driving-shaft whereby the awl is positively actuated in both directions.

5. In a machine of the class described, a driving-shaft, a lever constantly operated by said driving-shaft, an awl, means for connecting said lever and awl to render the awl operative to enter and withdraw from the stock, mechanism for moving the awl to feed the stock, and means for suspending said entering and feeding operations of the awl during repeated rotations of the driving-shaft.

6. In a machine of the class described, a driving-shaft, an oscillating lever operated by said driving-shaft, an awl, mechanism actuated by said oscillating lever for moving the awl, a clutch for connecting said mechanism and said lever, and means arranged for operation independently of the regular operations of the machine for operating said clutch to render the awl operative or inoperative.

7. In a machine for inserting fastenings, a driving-shaft, a driver constantly operated by the driving-shaft, an awl-bar, an awl carried thereby, and two sets of mechanism intermediate the driving-shaft and the awl-bar for operating the awl, one of said sets of mechanism including a clutch-pin and the other set of mechanism having a clutch-hole to receive said clutch-pin, and means under the control of the operator for actuating said clutch-pin.

8. In a machine for inserting fastenings, a driving-shaft, an awl, mechanism intermediate the driving-shaft and the awl for operating the awl, said mechanism including a clutch-pin, a spring for actuating the clutch-pin to connect the awl and the driving-shaft, and a yieldingly-actuated device under the control of the operator for moving said clutch-pin to disconnect the awl and the driving-shaft.

9. In a machine for inserting fastenings, a driving-shaft, an awl, mechanism intermediate the driving-shaft and the awl for operating the awl, said mechanism including a clutch-pin, a spring for actuating the clutch-pin to establish a connection between the awl and the driving-shaft, a wedge under the control of the operator and operating against the tension of said spring for holding said clutch-pin in inoperative position, and means under the control of the operator to withdraw said wedge and allow the clutch-pin to become operative.

10. In a machine for inserting fastenings, a driving-shaft, an awl, mechanism intermediate the driving-shaft and the awl for operating the awl, said mechanism including a clutch, means for operating the clutch to disconnect the awl from the driving-shaft and render the awl inoperative while the driving-shaft continues in operation, mechanism for feeding fastening material, and means for rendering said feeding mechanism inoperative when the awl is inoperative.

11. In a machine for inserting fastenings, a driving-shaft, an awl, mechanism intermediate the driving-shaft and the awl for operating the awl, said mechanism including a clutch, means arranged to be operated while the driving-shaft is in operation for actuating the clutch to connect the awl with the driving-shaft and render the awl operative, mechanism for feeding fastening material, and means for rendering said feeding mechanism operative when the awl is operative.

12. In a machine of the class described, a driving-shaft, an awl-bar and awl, a second shaft, connections between said second shaft and the awl-bar, a clutch, a continuously-moving actuator for the awl-bar, and means under the control of the operator for causing said clutch to stop the movement of said awl-bar while the actuator continues in motion.

In testimony whereof I have signed my name to this specification in the presence of two subscribing witnesses.

EDWIN T. FREEMAN.

Witnesses:
NELSON W. HOWARD,
LOUIS H. BAKER.